US007444263B2

United States Patent
White et al.

(10) Patent No.: US 7,444,263 B2
(45) Date of Patent: Oct. 28, 2008

(54) PERFORMANCE METRIC COLLECTION AND AUTOMATED ANALYSIS

(75) Inventors: David Ronald White, Merrimack, NH (US); John J. McGee, Christiansburg, VA (US); Steven J. Baron, Nashua, NH (US); Edward W. Macomber, Westford, MA (US); Earl Charles LaBatt, Jr., Litchfield, NH (US)

(73) Assignee: Opnet Technologies, Inc., Bethesda, MD (US)

( * ) Notice: Subject to any disclaimer, the term of this patent is extended or adjusted under 35 U.S.C. 154(b) by 0 days.

(21) Appl. No.: 11/832,319

(22) Filed: Aug. 1, 2007

(65) Prior Publication Data
US 2008/0016412 A1 Jan. 17, 2008

Related U.S. Application Data

(63) Continuation-in-part of application No. 10/243,534, filed on Sep. 13, 2002, now Pat. No. 7,219,034, and a continuation-in-part of application No. 10/198,689, filed on Jul. 18, 2002, now Pat. No. 7,076,695, and a continuation-in-part of application No. 10/186,401, filed on Jul. 1, 2002, now Pat. No. 6,643,613.

(60) Provisional application No. 60/821,023, filed on Aug. 1, 2006.

(51) Int. Cl.
*G06F 19/00* (2006.01)
*G06F 15/00* (2006.01)
*G06F 17/18* (2006.01)
*G21C 17/00* (2006.01)

(52) U.S. Cl. .......................... 702/180; 703/21; 700/51

(58) Field of Classification Search ................ 702/179, 702/180, 182, 186; 703/21, 22; 717/104, 717/124, 127; 709/223–226; 700/51, 80
See application file for complete search history.

(56) References Cited

U.S. PATENT DOCUMENTS

| 6,457,143 | B1 * | 9/2002 | Yue ............................ 714/43 |
| 6,571,285 | B1 * | 5/2003 | Groath et al. ............... 709/223 |
| 6,643,613 | B2 | 11/2003 | McGee et al. |
| 6,823,382 | B2 | 11/2004 | Stone |

(Continued)

OTHER PUBLICATIONS

Porras et al., 'A Mission-Impact-Based Approach to INFOSEC Alarm Correlation', 2002, SRI International Publication, pp. 95-114.*

*Primary Examiner*—Edward Raymond
*Assistant Examiner*—Elias Desta
(74) *Attorney, Agent, or Firm*—Davis Bujold & Daniels, P.L.L.C.

(57) ABSTRACT

A metric monitoring and analysis system including dynamic sampling agents located in monitored system elements and a service management platform. Each sampling agent includes a data adapter collecting metric data in a common format, a threshold generator for determining dynamic metric threshold ranges, an alarm detector generating an indicator when a metric deviates outside a dynamic threshold range or a static threshold, and a deviation tracker generating an alarm severity scores. The service platform includes an alarm analyzer identifying root causes of system alarm conditions by correlation of grouped metrics or forensic analysis of temporally or statistically correlated secondary forensic data or data items from a service model of the system.

18 Claims, 4 Drawing Sheets

U.S. PATENT DOCUMENTS

| | | |
|---|---|---|
| 6,928,471 B2 * | 8/2005 | Pabari et al. ............... 709/223 |
| 6,968,540 B2 | 11/2005 | Beck et al. |
| 7,076,695 B2 | 7/2006 | McGee et al. |
| 7,219,034 B2 | 5/2007 | McGee et al. |

* cited by examiner

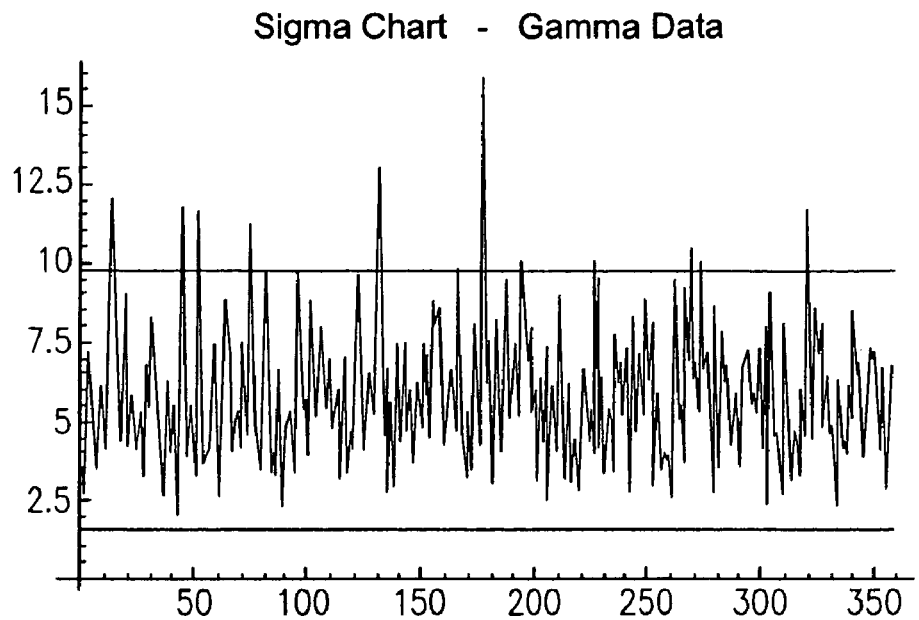
FIG. 1 - SPC applied to non-normal data
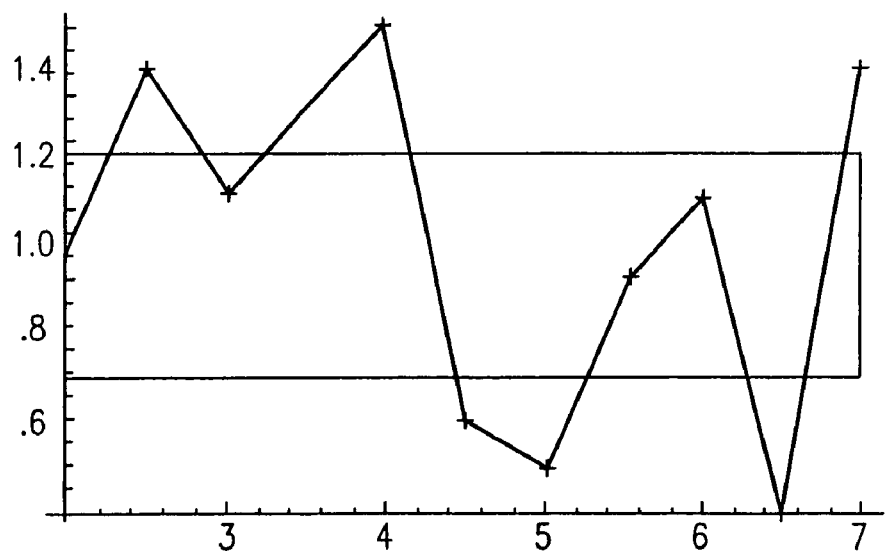
FIG. 3 Area Out vs. Limit Range In Metric Scoring

PERFORMANCE METRIC COLLECTION AND AUTOMATED ANALYSIS

CROSS REFERENCES TO RELATED APPLICATIONS

The present application is related to and claims benefit of co-pending provisional U.S. Patent Application 60/821,023 filed Aug. 1, 2006, which in turn is a continuation-in-part of and claims benefit of co-pending U.S. patent application Ser. No. 10/243,534 filed Sep. 13, 2002 and which has issued as U.S. Pat. No. 7,219,034, which in turn is a continuation-in-part of and claims benefit of co-pending U.S. patent application Ser. No. 10/198,689 filed Jul. 18, 2002 and which has issued as U.S. Pat. No. 7,076,695, which in turn is a continuation-in-part of and claims benefit of co-pending U.S. patent application Ser. No. 10/186,401 filed Jul. 1, 2002, which has issued as U.S. Pat. No. 6,643,613. The present application is also related to U.S. Pat. No. 6,823,382 to Stone for a MONITORING AND CONTROL ENGINE FOR MULTI-TIERED SERVICE-LEVEL MANAGEMENT OF DISTRIBUTED WEB-APPLICATION SERVERS and to U.S. Pat. No. 6,968,540 to Beck et al. for a SOFTWARE INSTRUMENTATION METHOD AND APPARATUS.

FIELD OF THE INVENTION

A method and apparatus for computer system performance and metric analysis which reduces problem-solving efforts in both pre-deployment and production environments for networked applications.

BACKGROUND OF THE INVENTION

The efficient, optimum operation of large, complex systems, such as web-based enterprise systems, requires the monitoring, careful analysis and identification of system metrics that reflect the performance of the system and the use of information regarding system metrics to identify probable root causes of performance problems in complex, distributed, multi-tier applications. This need is important during both pre-deployment load/stress testing and in production operations, typically requires quickly sifting through thousands of metrics across multiple application tiers and servers and the determination of a probable handful of problem area that require remediation. It must also be noted that these needs become even more critical, and are even more difficult to satisfy, when personnel and expertise are limited.

A complex modern system, however, such as web-based enterprise systems, may involve thousands of performance metrics, ranging from relatively high-level metrics, such as transaction response time, throughput and availability, to low-level metrics, such as the amount of physical memory in use on each computer on a network, the amount of disk space available, or the number of threads executing on each processor on each computer, any of which or any combination of which may be significant to the operations of the system and abnormalities therein. Such metrics, which in general relate to the operation of database systems and application servers, operating systems, physical hardware, network performance, and so on, all must be monitored, across networks that may include many computers, each executing numerous processes, so that problems can be detected and corrected when or preferably before they arise.

Some system monitoring methods of the prior art have attempted to identify and monitor only the metrics and combinations of metrics that are significant in representing the operation of a system and in detecting any abnormalities therein. Due to the complexity of modern systems, however, and because of the large number of possibly significant metrics and combinations of metrics, it is unfortunately common for a monitoring system or operator to miss monitoring at least some of the significant metrics or combinations of metrics Other systems of the prior art seek to avoid this problem by attempting to monitor as many metrics or combinations of metrics. It is a relatively common occurrence, however, again due to the complexity of modern systems and the large number of possibly significant metrics and combinations of metrics, that a monitoring system or an operator will become overwhelmed by the volume of information that is presented and will as a result miss or misinterpret indications of, for example, system abnormalities. It is therefore advantageous to be able to clearly and unambiguously identify and provide information pertaining to only those metrics or combinations of metrics that are of significance to or usefully represent and reflect the performance of the system, such as abnormalities in system operation.

The clear and unambiguous identification and presentation of metrics and combinations of metrics accurately reflecting system performance or problems, in turn, involves a number of data collection and processing operations, each of which involves unique and significant problems that have seriously limited the capabilities of performance monitoring systems in the prior art and, as a consequence, the performance of the systems being monitored.

The problems of the prior art begin with the original collection of meaningful and timely information regarding system performance metrics. A typical large system may involve perhaps thousands of performance metrics, each of which may or may not be of significance to the performance of the system or indicative of problems in the system. The first recurring problem is therefore to select and collect sufficiently accurate and timely information pertaining to a sufficiently large number of performance metrics so as to have a useful representation of the system operation and performance. Again, however, this is often an overwhelming task due to the potentially very large number of metrics of interest.

Another recurring problem area in performance monitoring systems and methods of the prior art is in identifying those metrics, from all of the metrics that can be or that are monitored, that represent a current or past aspect of interest of the system performance. This task is conventionally performed by detecting those performance metrics that are outside the bounds of normal operation, which is typically carried out by checking the values of the monitored metrics and combination of metrics against threshold values. If the metric is within the range defined by the threshold values, then the metric is behaving normally. If, however, the metric is outside the range of values defined by the thresholds, an alarm is typically raised, and the metric may be brought to the attention of an operator. The determination and setting of thresholds, however, can adversely effect the operation of the system since significant events may fail to trigger an alarm if a threshold is set too high, but an excessive number of false alarms can be generated if a threshold is set too low.

Many monitoring systems of the prior art allow an operator to set the thresholds beyond which an alarm should be triggered for each metric. In complex systems that monitor thousands of metrics, however, this is often impractical since setting such thresholds is usually labor intensive and is typically prone to errors, particularly since the value of a given metric, and thus its thresholds, may be influenced by a number of other metrics. Additionally, user-specified thresholds, which must typically be fixed due to the time and effort required to determine and set the thresholds, are inappropriate for many metrics, such as metrics for systems with time varying loads or performance levels.

In an attempt to mitigate such problems, including both the problems in determining and setting large numbers of thresholds and in determining and setting time varying thresholds, some systems provide a form of dynamically-computed thresholds using simple statistical techniques, such as standard statistical process control (SPC) techniques that assume that the distribution of values of a given performance metric fit some standard statistical distribution, and measure the values of the metric against the assumed statistical distribution. For example, the values of many performance metrics at least approximately fit a Gaussian, or "normal" distribution and many commonly used SPC methods are based upon such "normal", or Gaussian", distributions.

Unfortunately, however, the distribution of values of many metrics do not fit such "normal" of Gaussian distributions, making the thresholds that are set using typical SPC techniques inappropriate for such metrics or systems. For example, and as illustrated in FIG. 1, many performance metrics have values that at least approximately fit Gamma distributions, which are characterized by asymmetric distributions of values about a mean, while Gaussian or normal distributions are characterized by having symmetric distributions of the values about the mean. As a consequence, and again as illustrated in FIG. 1, if SPC techniques based on normal or Gaussian distributions are used to generate threshold values for a metric having a non-symmetric distribution, such as a Gamma distribution, the upper limit will be generally set too low when the lower threshold is set correctly and the lower threshold will be set too high if the upper threshold is set correctly. In a further example, many performance metrics exhibit self-similar or fractal statistical distributions and, again, typical SPC techniques using normal or Gaussian distributions will generally fail to produce optimal or even useful thresholds.

It should be noted that some attempts of the prior art to address this problem have attempted to do so by transforming the sample data from a non-symmetric distribution to a normal or Gaussian distribution. Such attempts have not been successful, however, because the underlying assumptions, that is, that processes for normal statistical distributions are valid for non-system distributions, are fundamentally fallacious no matter what is done to the data since the data is still fundamentally non-symmetric. In addition, attempts to transform non-symmetric data into normal distribution data inherently and inescapably distorts the data, again resulting in fundamentally erroneous results.

In a further example of the problems recurrent in detecting metric values by threshold comparison, many performance metrics exhibit periodic patterns, such as having value ranges varying significantly according to time-of-day, day-of-week, or longer activity cycles. Thus, for example, a metric may have one range of typical values during part of the day and a substantially different set of typical values during another part of the day. Current dynamic threshold systems typically fail to address this issue.

In a still further typical problem in metric thresholding, current dynamic threshold systems typically do not incorporate metric values occurring during alarm conditions, that is, during periods when the metric value exceeds the current threshold, when adjusting the threshold value for the metric to accommodate changes in the metric value range over time. The threshold system may, as a consequence, treat a long term, persistent change in the values of a metric as a series of short alarm conditions rather than as a long term shift in the metric value range. This situation will often result in numerous false alarm conditions until the threshold is adjusted to accommodate the shift in metric value range, which often requires manual adjustment of the threshold by an operator.

A still further recurring problem in monitoring the performance of a system is the methods for use of the information regarding system metrics to identify probable root causes of performance problems in complex, distributed, multi-tier applications, such as identifying metrics and correlations and groupings of metrics and metric behaviors that particularly reflect system performance or abnormalities. This problem is typically due to or is aggravated by the large number of metrics and combinations of metrics and metric inter-relationships that must be considered.

For example, many systems of the prior art employ linear correlation techniques to detect the correlations between and groupings of metrics that are representative of certain system performance characteristics. Linear correlation techniques, however, are sensitive to "outlier" metric values, that is, erroneous measurements of metric values, metric values that are significantly outside the expected range of values, that is, "spikes" in metric values. In addition, linear correlation techniques do not reliably or accurately detect or represent highly non-linear relationships between metrics.

Another commonly employed method for identifying the metrics associated with or particularly indicative of system performance or abnormalities is metric pair correlation. Metric pair correlation, however, requires the comparison of each possible pair of metrics, so that metric pair correlation in a large system having perhaps thousands of metrics will typically require the comparison of millions of possible pairs of metrics.

Yet another method commonly used in determining the cause of a problem or abnormality is the use of cluster analysis algorithms to find metrics that are associated with a key offending metric, and the goal of such cluster analysis methods is to create groups of metrics containing significantly related members. In general, cluster analysis is the process of grouping metric data into classes or clusters of metrics wherein a cluster is a collection of data objects, such as metrics that are similar to one another within the same cluster and dissimilar to the metrics in other clusters. In principle, therefore, there is little association or correlation between clusters of metrics, and that while a cluster may not belong to any cluster, it cannot belong to more than one cluster. When an operator identifies a metric related to an offending alarm metric, therefore, the identification will also be of the cluster of which the metric is a member. Because all metrics in that cluster are known and are known to be causally related to the identified metric, the totality of information regarding the metrics of the cluster may provide clues as to the cause of the alarm event that identified the initial metric.

Unfortunately, the algorithms that are typically used for cluster analysis are complex and are difficult to apply to a dynamic or adaptive system. For example, cluster analysis divides metrics into static disjoint groups, so that it is difficult to use these algorithms in situations where the relations between metrics may change. That is, changes in the metrics may also result in changes in the relationships between the metrics and thereby in the clusters. It then becomes impossible or at least impractical to track the changing correlations between metrics and, as a result, a cluster analysis based system can overlook correlations of metrics between groups and thus miss possible problem causes.

Lastly, the above discussed problems with the techniques employed by typical monitoring systems in correlating or grouping metrics for the purpose of determining system performance or problems is further compounded because these methods are difficult to apply to dynamic or adaptive systems. That is, and for example, the conditions in a web-based enterprise system may change from day to day, week to week, or month to month, and some conditions change more frequently, such as minute to minute or hour to hour. In any case, these changes will be reflected in the values of the various metrics, and possibly in the interrelations between metrics. To monitor a complex web-based enterprise system successfully, therefore, it is necessary for the system to adapt dynamically to these changes when performing tasks such as generating alarms or determining which groups of metrics are associated with each other in such a way as to assist in identifying the cause of a failure or problem. As in the case of metric pair correlation, for example, the number of operations required to dynamically update the metric thresholds to reflect the current ranges of metric values will often render this method impractical.

The systems and methods of the present invention address these and other related problems of the prior art.

SUMMARY OF THE INVENTION

The present invention is directed to a method and system for performing system metric analysis by collecting metric data representing system operations from a plurality of system sources, determining a dynamic metric threshold range for each metric over successive time periods, indicating a metric alarm event by generating a metric threshold alarm indicator when a corresponding metric value deviates outside the dynamic threshold range, generating an alarm severity score for each metric alarm event, and performing a root cause analysis identifying a basic cause of a system alarm condition by at least one of correlation of grouped metrics with alarm conditions, and forensic analysis of selected secondary forensic data items recorded upon the occurrence of at least selected alarm conditions.

According to the present invention, the step of collecting metric data from system sources further includes the steps of collecting the metric data from each source in a source format and transforming the metric data from the corresponding source format into at least one common format, which may be performed by corresponding data adapters.

In addition, the step of determining a dynamic metric threshold range for each metric further includes the steps of generating an empirical estimate of an actual distribution of values of the metric, determining a trend in the actual distribution of the values of the metric, determining an expected range of the values of the metric over the time periods, and determining a dynamic threshold range for each metric based on the expected range of values of the metric. The method and system of the present invention may also indicate a metric alarm event by generating a metric threshold alarm indicator when a corresponding metric value deviates outside a static threshold range, and the step of generating an alarm severity score for each metric alarm further includes the step of determining the severity score as a ratio of a time and magnitude of the metric value deviation outside the threshold range to a width of the threshold range.

Also according to the present invention, the step of correlation and grouping of metrics with alarm indicators further includes at least one of the steps of performing a temporal alarm correlation process by identifying metrics having values resulting in alarm conditions that are correlated in time and performing a statistical metric correlation process by correlating pairs of metrics having values resulting in an alarm condition according to the relative ranks of the values of the metrics. In addition, the analysis of recorded secondary forensic data items and alarm indicators further includes at least one of recording selected key metrics defined as bounding the data items at least one of temporal and statistical correlation of the metrics with and recording data items selected from a service model of the system representing system operations associated with an alarm condition. It should also be noted that in the present invention the secondary forensic data items may comprise or include non-metric information pertaining to system conditions at occurrence of an alarm condition.

Still further according to the present invention, a metric monitoring and analysis system of the present invention is mapped onto a system whose metrics are to be monitored and analyzed and includes a plurality of dynamic sampling agents located in the system elements at each data source, wherein each dynamic sampling agent may include a data adapter for transforming the metric data from the corresponding source format into at least one common format, and a central service management platform where the root cause analysis is performed. The dynamic sampling agents therefore perform the functions of collecting metric data representing system operations from a plurality of system sources, determining a dynamic metric threshold range for each metric over successive time periods, indicating a metric alarm event by generating a metric threshold alarm indicator when a corresponding metric value deviates outside the dynamic threshold range, and generating an alarm severity score for each metric alarm event, thereby reducing the information that must be transmitted to the service management platform to the alarm indicators, including metric identifiers and values and severity scores, and the secondary forensic data items.

Other aspects, embodiments and advantages of the present invention will become apparent from the following detailed description which, taken in conjunction with the accompanying drawings, which illustrate the principles of the invention by way of example.

BRIEF DESCRIPTION OF THE DRAWINGS

The foregoing and other objects, features and advantages of the present invention, as well as the invention itself, will be more fully understood from the following description of various embodiments when read together with the accompanying drawings, in which:

FIG. 1 is a diagrammatic representation of a non-symmetric distribution of metric values;

FIG. 3 is an illustration of a computation of alarm severity scores by a threshold alarm generation process; and, FIG. 4 is a diagrammatic illustration of metric correlation relationships.

DETAILED DESCRIPTION OF THE INVENTION

Figure 2A:
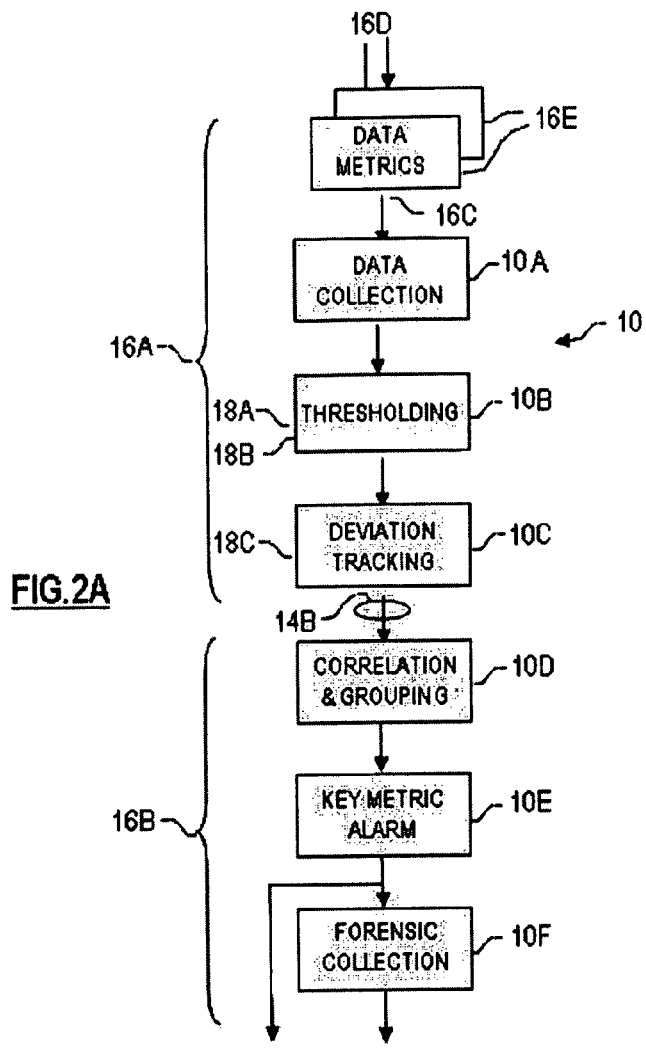
FIG. 2A is a diagrammatic illustration of a metric monitoring and analysis process.

According to the present invention, and as diagrammatically illustrated in FIG. 2A, the method of the present invention for the monitoring and analysis of system metrics that may affect or reflect the performance of the system may be regarded as comprised of a sequence of self-contained processes operating cooperatively. Certain of these processes are the subject of the present invention and are discussed in detail in the following while others are described in detail in related U.S. Pat. Nos. 6,643,613, 6,823,382 and 7,076,695, each of which are incorporated herein by reference.

A. Introduction

As illustrated in FIG. 2A, and as discussed in further detail in the following, metric monitoring and analysis process 10 begins with a metric data collection process 10A across as broad a spectrum of agents and sources as possible, including metrics representing the operation of, for example, the hardware and software elements of computers and other forms of processing units, interconnecting networks, storage units, databases, application servers, applications executing the transactions of the system physical hardware, operating systems and so on, each of which may be multi-tiered or interoperative with other elements of the system.

The collected metric related data is then accessed by a thresholding process 10B that monitors the metric data to dynamically establish thresholds for each monitored metric and identifies those metrics that are outside the bounds of normal or optimum system behavior and are therefore of potential interest in detecting and identifying abnormalities in the system operations or non-optimum behavior. It should be noted that the dynamic establishment of thresholds from the metric data and the detection of metrics outside the bounds of normal or optimum system behavior are described in detail in U.S. Pat. No. 7,076,695, which is incorporated herein by reference.

As discussed in detail in the following, deviation tracking process 10C then generates normalized out-of-limit scoring for the metrics identified as being of interest as being outside their respective dynamically established thresholds. The normalized scoring of metric threshold deviations for each metric of interest is based on the value by which each metric is outside the bounds of its thresholds and thereby permits dimensionless quantification of the relative deviation of each metric from its threshold bounds. The normalized scoring of the deviation of each metric of interest from its current threshold bounds permits the comparison and correlation of metric deviations between and among disparate metric types. The comparison and evaluation of disparate metric types is not possible with the simple statistical methods of the prior art, which limits metric deviation comparisons to comparable metric value units, and permits the identification and evaluation of previously unrealizable metric relationships and correlations.

The metric deviation tracking and scoring processes are then followed by metric correlation and adaptive grouping process 10D in which relationships and correlations between metrics and groups or combinations of metrics, including metric clusters, and including disparate as well as comparable metrics, are identified and established. It should be noted that the methods of the present invention for performing the metric correlation and adaptive grouping processes are described in detail in U.S. Pat. No. 6,643,613, which is incorporated herein by reference.

As discussed in further detail in the following, the metric tracking and scoring information is then used by metric alarm process 10E to identify the metrics and combinations of metrics of interest as indicating or representing system performance, including in particular abnormalities and non-optimum system behavior, with the results then being presented to the operator, or to further processing, to isolate and identify the causes of the system abnormalities or non-optimum behavior. The operator or system can then be directed through the steps and adaptations or changes necessary to remedy the system abnormalities or to achieve optimum system performance.

Lastly, a forensic event information collection process 10F accumulates and stores the alarm information from key metric alarm process 10E and the corresponding metric tracking and storing information from metric correlation and adaptive grouping process 10D for subsequent use. Such historic information may be used, for example, to identify long term metric trends or phenomena in the system or, for example, to identify groups, combinations or clusters of metrics and metric values reflecting long term or infrequently occurring affects or causes of abnormalities or non-optimum performance.

B. Detailed Descriptions of the Processes 10A-10F

Figure 2B:
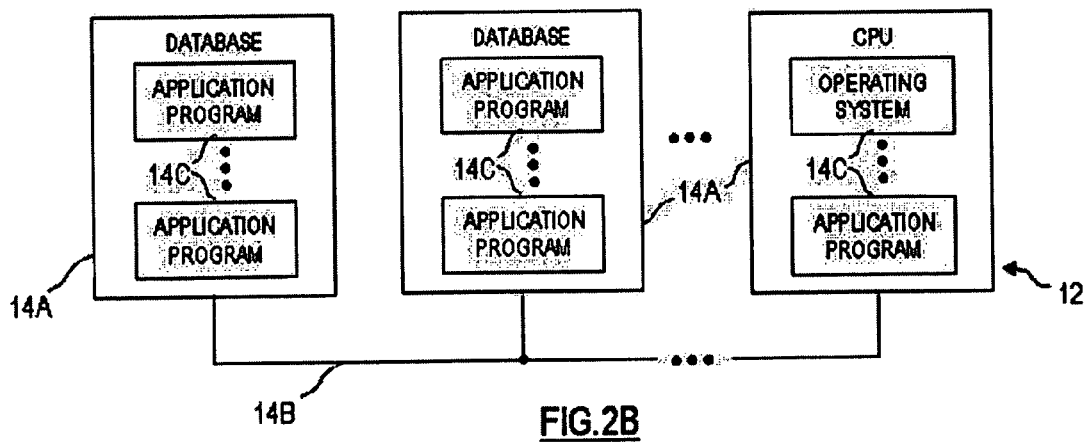
FIG. 2B is a generalized system in which the present invention is implemented.

Therefore next considering the above described processes in further detail, and first considering the metric data collection and data analysis by thresholding processes of the present invention as described generally above, FIG. 2B is a diagrammatic illustration of a generalized system 12 embodying the present invention. As indicated therein, a system 12 will include the range of hardware and software elements 14 necessary to accomplish the purposes of the system 12, including functional units 14A such as, for example, processing units including computers as well as other data and control processing sub-systems and systems and application servers, storage units, application servers, and databases and database servers, interconnected and communicating through networks 14B, and software elements 14C such as applications programs, operating systems, and so on. It will therefore be apparent, particularly after the following descriptions of the present invention, that the present invention can be embodiment and implemented in virtually any system and in any system element wherein performance metrics can represent the operation and performance of the system.

1. System Overview and Metric Data Collection Process 10A

Figure 2C:
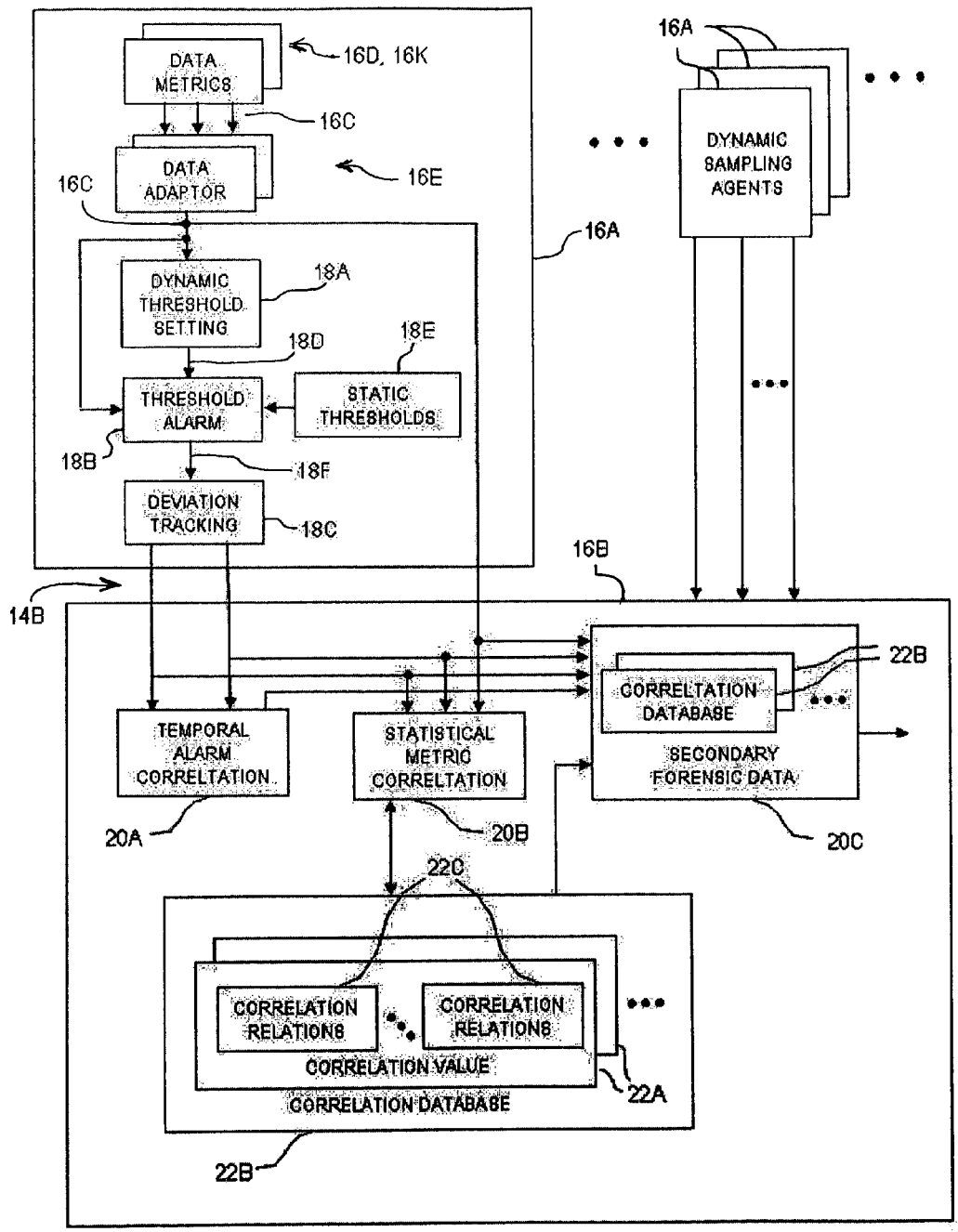
FIG. 2C is a diagrammatic illustration of a metric monitoring and analysis system.

As indicated in FIGS. 2A, 2B and 2C, a metric monitoring and analysis system 16 for performing the metric monitoring and analysis process 10 of the present invention is mapped onto a system 12 and includes a plurality of dynamic sampling agents 16A and a central service management platform 16B. Metric information 16C is collected and initially processed by dynamic sampling agents 16A located in each element 14 having at least one metric 16D of interest, such as applications servers 14C that carry out the transaction operations of the system 10, and is then communicated to the central service management platform 16B for further processing, as described in the following. It should be noted that central service management platform 16B may be a separate and independent element 14 of the system 10, or may be located within another element 14, such as a processing unit 14A or application server 14F, and that communications of metrics information 16C between dynamic sampling agents 16A and central service management platform 14B will typically be through a network 14E of the system 10.

As illustrated, each dynamic sampling agent 16A includes at least one data adapter 16E wherein each data adapter 16E is designed to monitor and collect data of a given type or range of types from a given type of source or range of types of sources, and to transform such raw metric data into a common format or range of formats efficiently usable by the following processes of the system 16. A broad set of data adapters 16E thereby provides access to a wide range of types of metrics 16D in any given system 10, allows the system 16 to be implemented in a wide range of types of systems 10 and to collect metric data 16C regarding system performance from, for example, processor units, input/output (I/O) units, storage systems and sub-systems, networks, databases, web servers, and application components thereof, thus providing a rich source of raw data as the basis for subsequent analysis.

Each dynamic sampling agent 16A therefore controls the timing, rate and time synchronization of data collection among elements 14 by the associated data adapters 16E and the time granularity of the metric data 16C, such as at second and sub-second granularity. Dynamic sampling agents 16A further include processes for performing three fundamental metric data 16C analysis tasks before sending the consolidated metric data 15C and the initial analysis results to service management platform 16B, a dynamic threshold setting process 18A, a threshold alarm generation process 18B, and a deviation tracking process 18C.

1. 2. Dynamic Thresholding Process 10B

In a metric monitoring and analysis system 16 of the present invention, that is, in the dynamic sampling agents 16A of the system 16, the dynamic threshold setting process 18A recognizes that performance metrics do not typically exhibit normal, or bell-curve, distributions but are instead characterized by values that cluster about a baseline but have scattered extreme values. As described in detail in U.S. Pat. No. 7,076,695, which is incorporated herein by reference, the dynamic threshold process 18A of a metric monitoring and analysis system 16 of the present invention makes no assumptions about the shape of the distribution of the metric values 16C. As described in U.S. Pat. No. 7,076,695, the dynamic threshold process 18A performed in a dynamic sampling agent instead creates an empirical estimate of the actual distribution of the values and the trend in that distribution in order to compute the expected range of the data over successive time periods in order to generate dynamic thresholds 18D. As described in U.S. Pat. No. 7,076,695, this method greatly reduces the false alarm rate as compared with rudimentary methods while maintaining sensitivity to truly unexpected metric behavior.

It should be noted that dynamic threshold process 18A may also be advantageously employed in pre-deployment application performance testing of a system 10, which often involves too many metrics for manual processes to be effectively useful. In this instance, a load-testing tool, not explicitly shown, is used to apply a controllably increasing workload to a system 10 to induce stresses and workloads that will reveal points of performance breakdown, and is helpful in identifying and locating the causes of such breakdowns. The process may be further used to determine dynamic load limits for the system undergoing pre-deployment performance testing by reducing the load from the performance breakdown point until the system performance is adequate, with this load level then being established as the system critical load limit. Repeated determination of such critical load limits can be used in scalability or stress testing to determine when any one of thousands of metrics deviates significantly from its value near the critical load point.

Dynamic threshold process 18A may also be employed in long running testing to determine whether a system 10 contains any spot performance problems that appear only after extended periods of operations with a range of tasks.

The dynamic thresholds 18D generated by dynamic threshold process 18A, static thresholds 18E generated, for example, by operator input or by conventional static statistical processes, and the metric data 16C captured by dynamic sampling agent 16A from data adapters 16E are provided to threshold alarm generation process 18B, which detects threshold events 18D, that is, the crossing of a static or dynamic threshold by a metric data 18C. Threshold alarm generation process 18B generates an alarm condition indicator 18F whenever a metric data 16C value crosses a static or dynamic threshold and includes configurable threshold detection and filtering of static threshold limit violations so that single spurious metric data 16C values do not cause false alarms.

1. 3. Deviation Tracking Process 10C

Alarm condition indicators 18F are in turn provided to deviation tracking process 18C, which generates corresponding alarm messages 18E that each include a numerical value or score of alarm severity based on the duration and extent of the corresponding condition causing the alarm event, which further allows system-wide alarm severity scoring. The computation of alarm severity scores by threshold alarm generation process 18B is illustrated in FIG. 3, wherein it is shown that alarm severity scoring is based on the ratio of the (duration of event)X (value by which threshold exceeded) area to the distance between the upper and lower thresholds of that metric 16D. It is therefore apparent that the resulting score is effectively independent of the value scale or range and unit dimensions of the metric 16D and is essentially dependent only on how "unexpected" the value was over the time period of interest.

Tracking process 18C further recognizes and generates corresponding alarm messages 18E for metrics 16D of special interest, which are designated as "key metrics" 16D. Key metrics 16K are accorded special priority and handling in processing by following higher level analysis processes, such as alarm correlation processes, and may include, for example, service request rates, overall response times, or queue sizes.

1. 4. Adaptive Grouping and Correlation Process 10D and Metric Alarm Process 10E

Next, considering service management platform 16B, a primary function provided by service management platform 16B is root cause analysis, that is, the analysis and identification of the basic causes of abnormalities or non-optimum performance in a system. As described below, root cause analysis is accomplished by the identification of which metrics 16D have effects on other metrics 16D, identification of the characteristics of those relationships and effects, and the grouping and correlation of processes according to those relationships in a manner to assist in the identification of the root causes of abnormalities or non-optimum performance. Root cause analysis is a significant diagnostic tool for all metrics 16D and is particularly significant in the case of key metrics 16D which, as discussed above, are metrics 16D that have been identified as particularly significant metrics 16D. As will be described in the following, service management platform 16B employs three complementary processes for revealing interdependencies among metrics 16D and in particular among key metrics 16K. These processes include a temporal alarm correlation process 20A, a statistical metric correlation process 20B, and a secondary forensic information gathering process 20C, which are defined for primary trigger metrics 16D and, optionally, for the higher ranking related metrics 16D.

Temporal alarm correlation process 20A applies a set of rules in order to detect alarm patterns, that is, patterns of alarm threshold violations, that are indicative of a significant system event. Temporal alarm correlation thereby detect non-random patterns of alarm events and, in particular, patterns of alarm events other than statistical distribution patterns such as normal or Gaussian distributions. As a consequence, temporal alarm correlation is capable of distinguishing spurious alarms, which result from the normal statistical variations of metric values, from alarm patterns that can only have a non-random cause. For example, a cluster detection rule may elevate an alarm when at least a certain number of metrics of a particular class raise an alarm within a given time window. Temporal alarm correlation process 20A further ranks such alarm patterns by generating deviation scores, as discussed above, for each time-correlated metric 16D or key metric 16K involved in an apparent pattern of alarm events.

Statistical metric correlation process 20B, which is described further in U.S. Pat. No. 6,643,613, which is incorporated herein by reference, determines statistical relationships, if any, between the values 16C of individual metrics 16D and of key metrics 16K, wherein such statistical relationships can often also identify or at least provide information pertinent to or clues to causal dependencies between metrics 16D and key metrics 16K. In this regard, two or more metrics 16D, including key metrics 16K, are defined as correlated when a change or changes in one or more metrics 16D indicates a change or changes and the amounts of the change or changes in one or more other metrics 16D.

The present invention recognizes that correlations between metrics 16D. including correlations between key metrics 16K, are often non-linear and "noisy", that is, have wide distributions of values 16C wherein a majority of the values 16C fall within a relatively predictable band of values 16C but wherein a statistically significant number of values 16C are "outliers", that is, values falling well outside the band containing the majority of values 16D. The statistical metric correlation process 20B of the present invention, however, recognizes and accommodates the occurrence of "outlier" values 16C by employing a robust form of correlation that is insensitive to such outliers.

For example, in a present embodiment of statistical metric correlation process 20B, statistical metric correlation process 20B employs nonparametric, or rank correlation, to correlate pairs of metrics in an alarm group instead of using conventional linear correlation. In rank correlation in general, the actual measured numeric value of a particular data element is replaced by a number representing its rank among other data elements in the sample. As a result, outliers, which may have comparatively large measured numeric values, have little effect on the correlation test because the large measured values are replaced by a proportionally much smaller value representing the rank of the outlier's measured value compared to the measured values of other measured data items. For example, a set of 10 data items may include nine data items having measured values between 0 and 5 and one outlier data item having a measured value of 50, which may, for example, represent the 10th rank among the data items out of a scale or range of 10 ranks. The outlier's measured value of 50, however, would be replaced by its rank value of 10, thus effectively reducing the effect of the outlier value on a correlation process to one fifth of the effect of its measured value. Rank order correlation, such as Spearman rank-order correlation, for example, will therefore reveal correlations that would otherwise be obscured by the disparate values of only a part of the data items, that is, the outlier data items.

Figure 4:
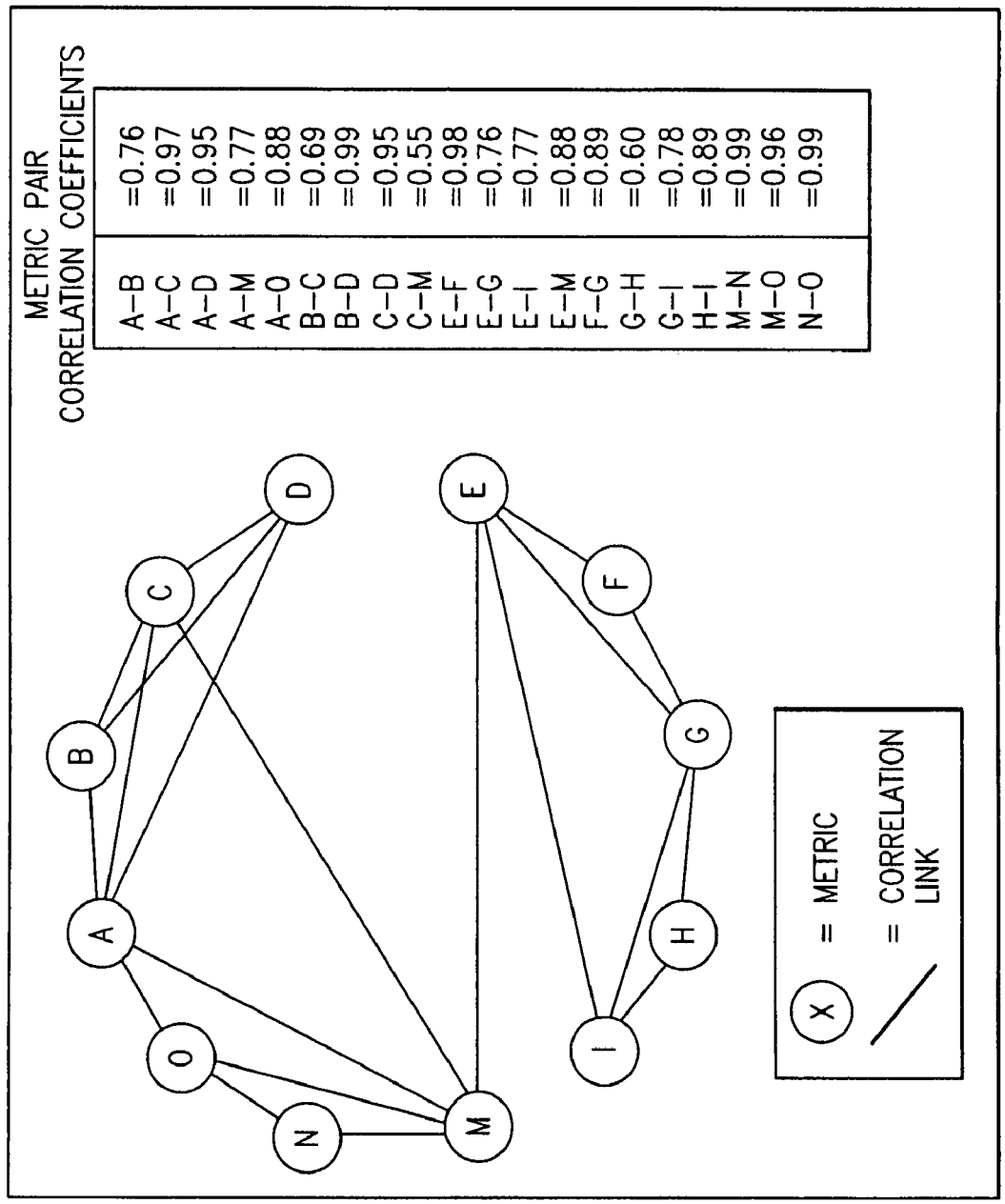

Statistical metric correlation process 20B further accommodates the potentially very large number of metric 16D relationships by continuously estimating and storing a correlation value 22A representing the strength or degree of correlation between all pairs of metrics that present threshold alarms within a short time window. This method thereby mitigates the previously intractable problem of testing all pairs within a system, as a complex system could, for example, contain more than one hundred million metric correlation pairs. Over time, statistical metric correlation process 20B accumulates a correlation database 22B representing correlation relations 22C between those metrics 16D and key metrics 16K that are most likely to be correlated, including deviation scores for each statistically-correlated metric 16D as a basis for ranking and further prioritization of potentially related issues. An exemplary correlation database with a typical result of such time accumulated correlation relationships is illustrated in the correlation graph of FIG. 4. Thereafter, correlation database 22B of metric correlation relationships 22C is queried whenever temporal alarm correlation process 20A detects a significant event to form a group of closely related metrics to identify correlated or potentially correlated metrics 16D and key metrics 16K from different tiers of the system 10 processes that may be pertinent to the alarm condition.

1. 5. Forensic Event Collection Process 10F

Lastly, secondary forensic information gathering process 20C collects and stores secondary forensic information 22D that is related to metric 16D alarms, and in particular to key metric 16K alarms, but that does not represent quantitative performance metrics, that is, is not comprised of data items that can be statistically analyzed to indicate abnormalities or non-optimum performance. Secondary forensic information 22D is essentially information pertaining to the context or conditions in which a metric alarm occurs, rather than being directly related to a metric involved in a metric alarm, and can take many forms. For example, secondary forensic information 22D may be information identifying or pertaining to the processes executing on a server, information from server log files, currently executing SQL database queries, application threads of memory utilization dumps, configuration and configuration change information, Java virtual machine execution traces, network related information from network controllers, and so on The relationship between an item of secondary information and an alarm event, that is, the validity of the secondary information as representative of some factor or aspect of the alarm event, is transitory and specific. That is, due to the continuously changing natures and the relationship complexities of the metrics and the operational factors represented by secondary information 22D, the relationship between any item of secondary information 22D and the metrics 16D involved in an alarm condition has validity and relevance only at the time of the alarm condition. As such, the secondary forensic information existing at the time of an alarm conditions, and the metric values 16C of interest, must be captured within a short time of the alarm condition, and before the cause of the alarm condition and its relationship to the secondary information becomes obscured, invalid or irrelevant or disappears completely. The compilation of secondary forensic information 22D to supplement quantitative performance data will, however, maximize the likelihood that the probable root cause of the issue which resulted in the alarm will be identified at a later time.

Secondary forensic information gathering process 20C is triggered by alarm condition indicators from, for example, dynamic sampling agents 16A, temporal alarm correlation process 20A and statistical metric correlation process 20B and, when triggered, automatically captures the designated secondary information 22D associated with the metrics 16D or key metrics 16K associated with the alarm condition indicator 18F, and stores the information for later analysis in identifying the source or cause of the alarm condition. In addition, and because secondary forensic information gathering process 20C is triggered and operates automatically, secondary forensic information gathering process 20C will capture the secondary forensic information 22D even when support staff are not available or cannot attend to the problem immediately.

The value of the collected and compiled secondary forensic information 22D, and in fact of any forensic information, is dependent upon the methods and skill by which the collection of the information is configured. One of the methods is user selection wherein a user having sufficient knowledge of a system and its behavior can use the static threshold detection processes of the system to identify and select which secondary information 22D is to be captured. While these techniques for secondary information collection are well established, they are rarely centralized or centrally managed, as in the system of the present invention.

A second method for selecting what secondary information 22D is captured and compiled is by intelligent decision processing by the secondary forensic information gathering process 20C or a separate process performing this task. This method is most useful when the problem or problems of a system cannot be characterized by data collection at one point or a limited set of points or where the problems are too complex or subtle for ready resolution by even an experienced, knowledgeable operator.

Essentially, the process for intelligent self monitoring identifies occurrences of abnormal or non-optimum behavior in the system such as indicated by the intelligent threshold alarms generated by, for example, dynamic sampling agents 16A, temporal alarm correlation process 20A or statistical metric correlation process 20B. When an alarm condition is indicated, secondary forensic information gathering process 20C captures concurrent secondary information 22D from a range of sources for subsequent analysis to identify correlations between the alarms and the secondary information 22D data items.

The system then employs various techniques to bound the problem of correlating alarm conditions with the secondary information 22D by identifying the sources of information that are of significance and value. This system catches the abnormal behavior, for example from the intelligent threshold alarms, and then determines what systems to collect from based on techniques for bounding the problem. These techniques include temporal and statistical alarm correlation wherein metrics 16D correlated to one or more key metrics 16K are determined as bounding the secondary information 22D of value, which can be combined with metric 16D and key metric 16K weighting to emphasize the metrics 16D and key metrics 16K of most interest and thus the secondary information 22D of most interest. A second method is the use of a service model that describes services, tiers and elements of the systems engaged in providing a service or task in which an abnormality of non-optimum behavior is detected, thus identify the secondary data 22D associated with that service or task, such as discussed further in U.S. Pat. No. 6,823,382, which is incorporated herein by reference.

Since certain changes may be made in the above described invention without departing from the spirit and scope of the invention herein involved, it is intended that all of the subject matter of the above description or shown in the accompanying drawings shall be interpreted merely as examples illustrating the inventive concept herein and shall not be construed as limiting the invention and that the subject matter and scope of the present invention shall be described and defined by the claims hereof.

What is claimed is:

1. A method for performing system metric analysis, comprising the steps of:
   collecting metric data representing system operations from a plurality of system sources,
   determining a dynamic metric threshold range for each metric over successive time periods,
   indicating a metric alarm event by
      generating a metric threshold alarm indicator when a corresponding metric value deviates outside the dynamic threshold range,
   generating an alarm severity score for each metric alarm event, and
   performing a root cause analysis identifying a basic cause of a system alarm condition by at least one of
      correlation of grouped metrics with alarm conditions, and
      forensic analysis of selected secondary forensic data items recorded upon the occurrence of at least selected alarm conditions.

2. The method for performing system metric analysis of claim 1, wherein the step of collecting metric data from system sources further includes the steps of:
   collecting the metric data from each source in a source format, and
   transforming the metric data from the corresponding source format into at least one common format.

3. The method for performing system metric analysis of claim 1, wherein the step of determining a dynamic metric threshold range for each metric further includes the steps of:
   generating an empirical estimate of an actual distribution of values of the metric,
   determining a trend in the actual distribution of the values of the metric,
   determining an expected range of the values of the metric over the time periods, and
   determining a dynamic threshold range for each metric based on the expected range of values of the metric.

4. The method for performing system metric analysis of claim 1, wherein the step of indicating a metric alarm event further includes the steps of:
   generating a metric threshold alarm indicator when a corresponding metric value deviates outside a static threshold range.

5. The method for performing system metric analysis of claim 1, wherein the step of generating an alarm severity score for each metric alarm further includes the step of:
   determining the severity score as a ratio of a time and magnitude of the metric value deviation outside the threshold range to a width of the threshold range.

6. The method for performing system metric analysis of claim 1, wherein the step of correlation and grouping of metrics with alarm indicators further includes at least one of the steps of:
   performing a temporal alarm correlation process by identifying metrics having values resulting in alarm conditions that are correlated in time, and
   performing a statistical metric correlation process by correlating pairs of metrics having values resulting in an alarm condition according to the relative ranks of the values of the metrics.

7. The method for performing system metric analysis of claim 1, wherein the step of analysis of recorded secondary forensic data items and alarm indicators further includes at least one of the steps of:
   upon occurrence of each of at least one of the selected alarm indicators,
      recording selected key metrics defined as bounding the data items with at least one of temporal and statistical correlation of the metrics and
      recording data items selected from a service model of the system representing system operations associated with an alarm condition.

8. The method for performing system metric analysis of claim 1, wherein the secondary forensic data items comprise non-metric information pertaining to system conditions at occurrence of an alarm condition.

9. The method for performing system metric analysis of claim 1, wherein:
the steps of
collecting metric data representing system operations from a plurality of system sources,
determining a dynamic metric threshold range for each metric over successive time periods,
indicating a metric alarm event by generating a metric threshold alarm indicator when a corresponding metric value deviates outside the dynamic threshold range, and
generating an alarm severity score for each metric alarm event,
are performed in dynamic sampling agents located at each data source, the step of performing a root cause analysis identifying a basic cause of a system alarm condition is performed
in a central service management platform, and
the method further includes the step of
communicating each metric alarm event and each alarm severity score for each metric alarm event from the dynamic sampling agent to the service management platform.

10. The method for performing system metric analysis of claim 2, wherein:
the step of collecting metric data from system sources is performed by dynamic sampling agents located at each data source, and
the steps of
collecting the metric data from a source in a source format, and
transforming the metric data from the corresponding source format into at least one common format,
are performed in each dynamic sampling agent by a data adapter.

11. A metric monitoring and analysis system, comprising:
a plurality of dynamic sampling agents, each dynamic sampling agent being located in a system element containing a metric of interest for monitoring and analysis and including
at least one plurality of data collectors for collecting metric data representing system operations from a plurality of system sources,
a threshold generator for determining a dynamic metric threshold range for each metric over successive time periods,
an alarm condition detector indicating a metric alarm event by
generating a metric threshold alarm indicator when a corresponding metric value deviates outside the dynamic threshold range, and
a deviation tracker for generating an alarm severity score for each metric alarm event, and
a single service management platform receiving alarm indicators and severity scores from the dynamic sampling agents and including
an alarm analyzer performing a root cause analysis identifying a basic cause of a system alarm condition by at least one of
correlation of grouped metrics with alarm conditions, and
forensic analysis of selected secondary forensic data items recorded upon the occurrence of at least one or more selected alarm conditions.

12. The metric monitoring and analysis system of claim 11, wherein each dynamic sampling agent further includes:
at least one data adapter for transforming the metric data from a corresponding source format into at least one common format.

13. The metric monitoring and analysis system of claim 11, wherein:
for each metric, the threshold generator
generates an empirical estimate of an actual distribution of values of the metric,
determines a trend in the actual distribution of the values of the metric,
determines an expected range of the values of the metric over the time periods, and
determines a dynamic threshold range for each metric based on the expected range of values of the metric.

14. The metric monitoring and analysis system of claim 11, wherein:
the alarm condition generator generates a metric threshold alarm indicator when a corresponding metric value deviates outside a static threshold range.

15. The metric monitoring and analysis system of claim 11, wherein:
the deviation tracker generates an alarm severity score for each metric alarm by determining the severity score as a ratio of a time and magnitude of the metric value deviation outside the threshold range to a width of the threshold range.

16. The metric monitoring and analysis system of claim 11, wherein the alarm analyzer performs a con-elation of grouped metrics by at least one of
a temporal alarm correlation process identifying metrics having values resulting in alarm conditions that are correlated in time, and
a statistical metric correlation process correlating pairs of metrics having values resulting in an alarm condition according to the relative ranks of the values of the metrics.

17. The metric monitoring and analysis system of claim 11, wherein the alarm analyzer records secondary forensic data items on the occurrence of at least selected alarm indicators by at least one of
recording selected key metrics defined as bounding the data items with at least one of temporal and statistical correlation of the metrics, and
recording data items selected from a service model of the system representing system operations associated with an alarm condition.

18. The metric monitoring and analysis system of claim 12, wherein the secondary forensic data items comprise non-metric information pertaining to system conditions at occurrence of an alarm condition.

* * * * *